(12) United States Patent
Clay et al.

(10) Patent No.: US 10,326,868 B1
(45) Date of Patent: Jun. 18, 2019

(54) CUSTOM MOBILE TELECOMMUNICATION DEVICE CONFIGURATION MANAGEMENT

(71) Applicant: Sprint Communications Company L.P., Overland Park, KS (US)

(72) Inventors: Brent A. Clay, Olathe, KS (US); Ricky A. Hohler, Olathe, KS (US); Jason B. Marshall, Olathe, KS (US); Ryan P. Sullivan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/160,430

(22) Filed: Oct. 15, 2018

Related U.S. Application Data

(63) Continuation of application No. 14/837,940, filed on Aug. 27, 2015, now Pat. No. 10,142,450.

(51) Int. Cl.
*H04M 1/247* (2006.01)
*H04M 1/725* (2006.01)
*H04W 4/24* (2018.01)
*H04W 88/02* (2009.01)

(52) U.S. Cl.
CPC ..... *H04M 1/2471* (2013.01); *H04M 1/72522* (2013.01); *H04M 1/72577* (2013.01); *H04W 4/24* (2013.01); *H04W 88/02* (2013.01)

(58) Field of Classification Search
CPC ........... H04M 1/2471; H04M 1/72522; H04M 1/72577; H04W 4/24; H04W 88/02
See application file for complete search history.

(56) References Cited

U.S. PATENT DOCUMENTS

| 10,142,450 | B1 | 11/2018 | Clay et al. | |
| 2011/0087975 | A1* | 4/2011 | Karsten | H04M 1/72586 715/762 |
| 2011/0208338 | A1 | 8/2011 | Eteminan et al. | |
| 2012/0276867 | A1 | 11/2012 | McNamee et al. | |
| 2015/0038130 | A1* | 2/2015 | Mao | G06F 9/44505 455/418 |

(Continued)

OTHER PUBLICATIONS

FAIPP Pre-Interview Communication dated Oct. 26, 2017, U.S. Appl. No. 14/837,940, filed Aug. 27, 2015.

(Continued)

*Primary Examiner* — Joseph E Dean, Jr.

(57) ABSTRACT

A method of managing a custom configuration manifest, comprising: collecting by an application configuration selections about a user equipment (UE) that are dynamically configured to create the custom configuration manifest; processing by a server the configuration selections and dynamically configuring the configuration selections to create the manifest; transmitting by the server the manifest to both the UE and a database with a plurality of custom configuration manifests; receiving by a custom configuration manifest handling application authorization through one or more authorization options, but not authentication credentials, to allow the manifest handling application to install preferred applications on the UE; installing by the manifest handling application the preferred applications on the UE without providing the authentication credentials; and customizing by the manifest handling application the UE based on the manifest.

20 Claims, 6 Drawing Sheets

(56) References Cited

U.S. PATENT DOCUMENTS

2015/0040246 A1    2/2015   Yuen et al.
2015/0180846 A1    6/2015   Nguyen et al.
2015/0317493 A1   11/2015   Florez et al.
2016/0050193 A1    2/2016   Kanov et al.

OTHER PUBLICATIONS

Final Office Action dated Apr. 25, 2018, U.S. Appl. No. 14/837,940, filed Aug. 27, 2015.
Notice of Allowance dated Jul. 26, 2018, U.S. Appl. No. 14/837,940, filed Aug. 27, 2015.

* cited by examiner

CUSTOM MOBILE TELECOMMUNICATION DEVICE CONFIGURATION MANAGEMENT

CROSS-REFERENCE TO RELATED APPLICATIONS

This application claims priority as a continuation application to U.S. patent application Ser. No. 14/837,940 filed on Aug. 27, 2015, entitled "Custom Mobile Telecommunications Device Configuration Management," by Brent A. Clay, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones may be purchased at service provider retail stores, electronics retail stores, and/or at general retail stores. Certain pre-selected, or pre-installed, applications are present on mobile phones before a customer purchases a mobile phone. These pre-installed applications may include a dialer, a messenger, a browser, and/or any other applications desired by the mobile phone provider. After purchasing a mobile phone, a customer may want to download or install other user-selected applications onto the mobile phone. When a customer purchases a mobile phone, generally the mobile phone must be configured, either activated or provisioned, to function on a network. The customer may download or install user-selected applications during the activation process. Another way a customer may acquire a mobile phone is through a lease agreement, rather than purchasing the mobile phone outright. A customer may pay a monthly fee to the mobile phone provider in order to retain and have access to a network connection.

SUMMARY

In an embodiment, a method of managing a custom configuration manifest is disclosed. The method comprises: (1) collecting by an application configuration selections about a user equipment (UE), where the configuration selections are transmitted to a custom configuration manifest server; (2) processing by the custom configuration manifest server the configuration selections, where the custom configuration manifest server dynamically configures the configuration selections to create the custom configuration manifest; (3) transmitting by the custom configuration manifest server the custom configuration manifest to one of the UE or a database with a plurality of custom configuration manifests; (4) transmitting by the custom configuration manifest server the custom configuration manifest to the other of the UE or the database with the plurality of custom configuration manifests; (5) receiving by a custom configuration manifest handling application authorization to allow the custom configuration manifest handling application to install preferred applications on the UE, where the authorization is received by the custom configuration manifest handling application through one or more authorization options, which do not include authentication credentials; (6) installing by the custom configuration manifest handling application the preferred applications on the UE without providing the authentication credentials; and (7) customizing by the custom configuration manifest handling application the UE based on the custom configuration manifest.

In an embodiment, a user equipment (UE) is disclosed. The UE comprises at least one processor and a non-transitory memory. The UE also comprises a custom configuration manifest handling application stored in the non-transitory memory that, when executed by the processor: (1) pulls down a custom configuration manifest during device activation, where the custom configuration manifest is pulled down from a custom configuration manifest server; and (2) configures the UE based on the custom configuration manifest. The UE also comprises a lease enforcement application stored in the non-transitory memory that, when executed by the processor: (1) monitors a lease satisfaction status by checking the custom configuration manifest server; and (2) responds to determinations of lease non-compliance by restricting functionality of the UE.

In an embodiment, a user equipment (UE) is disclosed. The UE comprises at least one processor, a non-transitory memory, and a custom configuration manifest handling application stored in the non-transitory memory that, when executed by the processor: (1) retrieves a first custom configuration manifest during device activation, where the first custom configuration manifest identifies a first access point name; (2) configures the UE based on the first custom configuration manifest, where the first custom configuration manifest installs preferred applications on the UE without providing authentication credentials; (3) receives a message to retrieve a second custom configuration manifest, where the second custom configuration manifest identifies a second access point name, where the second access point name is different than the first access point name; and (4) reconfigures the UE to use the second access point name.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
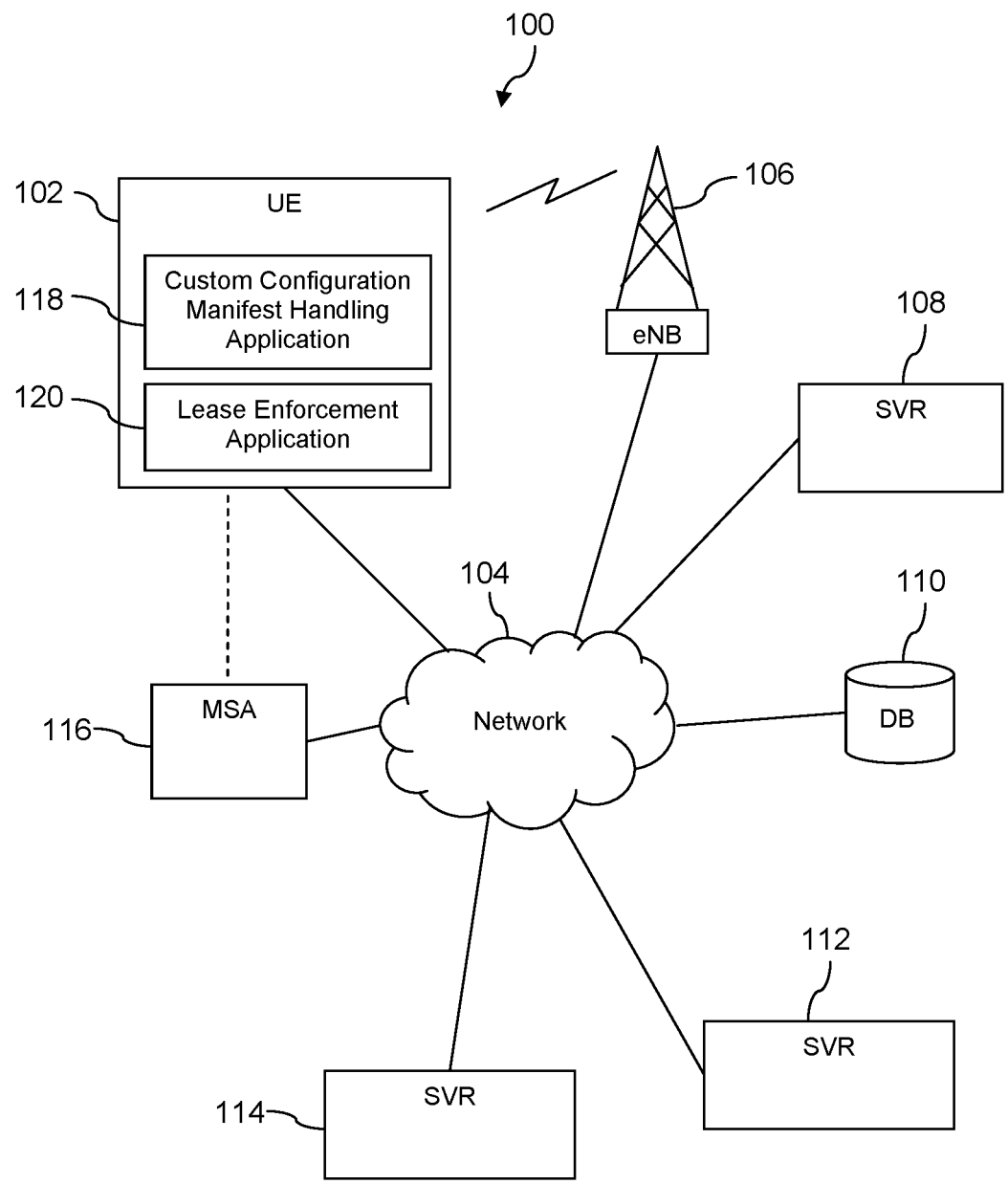
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a method and systems for increasing the speed of completing a sale and completing an activation process for a user equipment (UE) (e.g., a smart phone). At least in part this improvement is realized by streamlining the configuration of user choices by collecting configuration selections about a UE made by a user in discussions with a sales representative. The method further comprises processing and dynamically configuring the configuration selections to create the custom configuration manifest, transmitting the custom configuration manifest to the UE, receiving authorization to install preferred applications on the UE without providing authentication credentials, and customizing the UE based on the custom configuration manifest and/or based on a subscription plan and the configuration selections. The custom configuration manifest may be considered to be a kind of "punch-out list," a procedure list, and/or actual executable instructions for configuring the UE and/or customizing the look and feel of the UE. As discussed further hereinafter, a custom configuration manifest handling application may execute on a processor of the UE and perform the configuring and/or customizing of the UE based on the custom configuration manifest. It is widely recognized that the customary UE sales and activation processes are undesirably time consuming: the teachings of the present disclosure provide an opportunity to improve the customer experience of buying a new UE.

The process may further involve the installation of preferred applications on the UE that formerly entailed presenting confidential user credentials to gain permissions. The present disclosure teaches operating the UE in a mode that renders presentation of such user credentials unnecessary, thereby easing the process of configuring the preferred applications on the UE, for example applications that provide supplementary user convenience features based on a user subscription plan. This can avoid customer irritation and/or concerns about sharing confidential access keys, can increase the adoption rate for preferred applications, and can speed the activation process.

Further, problems may arise with leased UEs. The problems may include customers not making payments in accordance with terms of a lease but continuing to use the UE, customers not understanding that the UE is under a lease, and customers not returning leased UEs to the communication service provider when the lease expires. The present disclosure teaches a method and systems for managing leased UEs by using an application installed on the UEs to remind customers of any overdue payments or to prevent customers from using the UEs until any overdue payments are made. Additionally, the application may send a user interface to the UE, where the user interface may comprise a screen that restricts access to some functions of the UE. For example, access to general voice call service, access to email service, access to a contacts list, access to a browser application, access to a WiFi and/or Bluetooth® communication application, access to a media player application, access to a camera application may be blocked or prevented by the restricted user interface. Access to place and receive emergency calls (e.g., E-911 calls) would be supported in the restricted interface. Additionally, the ability to place a call to a wireless communication service provider to complete a payment on account or to otherwise resolve the status issues with the lease of the UE may likewise be supported in the restricted interface.

In addition, UEs that are no longer provisioned to receive communication service from a network provided by the communication service provider can undesirably waste wireless resources by repeatedly attempting to attach to the radio access network (RAN). These unprovisioned devices can slow the access time experienced by provisioned devices. The present disclosure teaches a method and systems for managing such unprovisioned UEs by redirecting their connection attempts to a different network address and then stopping the connection attempts and/or requests by the unconnected UEs to the network.

Turning now to FIG. 1, a system 100 is described. In an embodiment, the system 100 may comprise user equipment (UE) 102, a network 104, an enhanced Node B (eNB) 106 or a base transceiver station (BTS), a custom configuration manifest server 108, a custom configuration manifest database 110, a first access point name server 112, a second access point name server 114, a mobile sales assistant (MSA) application 116, a custom configuration manifest handling application 118, and a lease enforcement application 120.

The UE 102 is a mobile telecommunication device. The custom configuration manifest handling application 118 executes on the UE 102. In some embodiments, the UE 102 may be a mobile smart phone, a media player, a personal digital assistant (PDA), a headset computer, a wearable computer, a laptop computer, a notebook computer, or a tablet computer. In an embodiment, a customer may purchase a UE 102 from a retail store. At the retail store, a sales representative may talk with the customer about any desired options that the customer may want to include in the UE 102. The desired options may comprise any applications that the customer may want installed on the UE 102, any aesthetic features that the customer may want installed on the UE 102, preferred applications that the communication service provider desires to be installed on the UE 102, or any other options in accordance with the disclosure. The sales representative may enter the desired options into a notebook or workstation that may include the MSA application 116. Alternatively, the MSA application 116 may be on a different device than the notebook or workstation. The MSA application 116 may record the desired options. The sales representative may enter the desired options into the notebook or workstation as the customer expresses the desired options, or the sales representative may enter the desired options into the notebook or workstation after the customer has expressed all of the desired options.

In an embodiment, as the desired options are recorded by the MSA application 116, the desired options may be dynamically transmitted to the custom configuration manifest server 108. Alternatively, the desired options may be transmitted to the custom configuration manifest server 108 at one time after all of the desired options have been recorded by the MSA application 116. In an embodiment, the desired options may be transmitted to the custom configuration manifest server 108 through the network 104 or by any other means of transmission in accordance with the disclosure. In an embodiment, the custom configuration manifest server 108 may dynamically process the desired options and configure a custom configuration manifest as the custom configuration manifest server 108 receives the desired options. Alternatively, the custom configuration manifest server 108 may begin to process the desired options and configure the custom configuration manifest after the custom configuration manifest server 108 has received all of the desired options.

After the custom configuration manifest server 108 has configured the custom configuration manifest, the custom configuration manifest server 108 may transmit the custom configuration manifest to the UE 102. The custom configuration manifest server 108 may transmit the custom configuration manifest to the UE 102 through the network 104, through the eNB 106, by sending a short message service (SMS) to the UE 102 that prompts the UE 102 to retrieve the custom configuration manifest from the custom configuration manifest server 108, or by any other means in accordance with the disclosure. In an embodiment, after the custom configuration manifest has been transmitted from the custom configuration manifest server 108 to the UE 102, the custom configuration manifest handling application 118 may use the custom configuration manifest to configure the UE 102 during an activation process.

Figure 2:
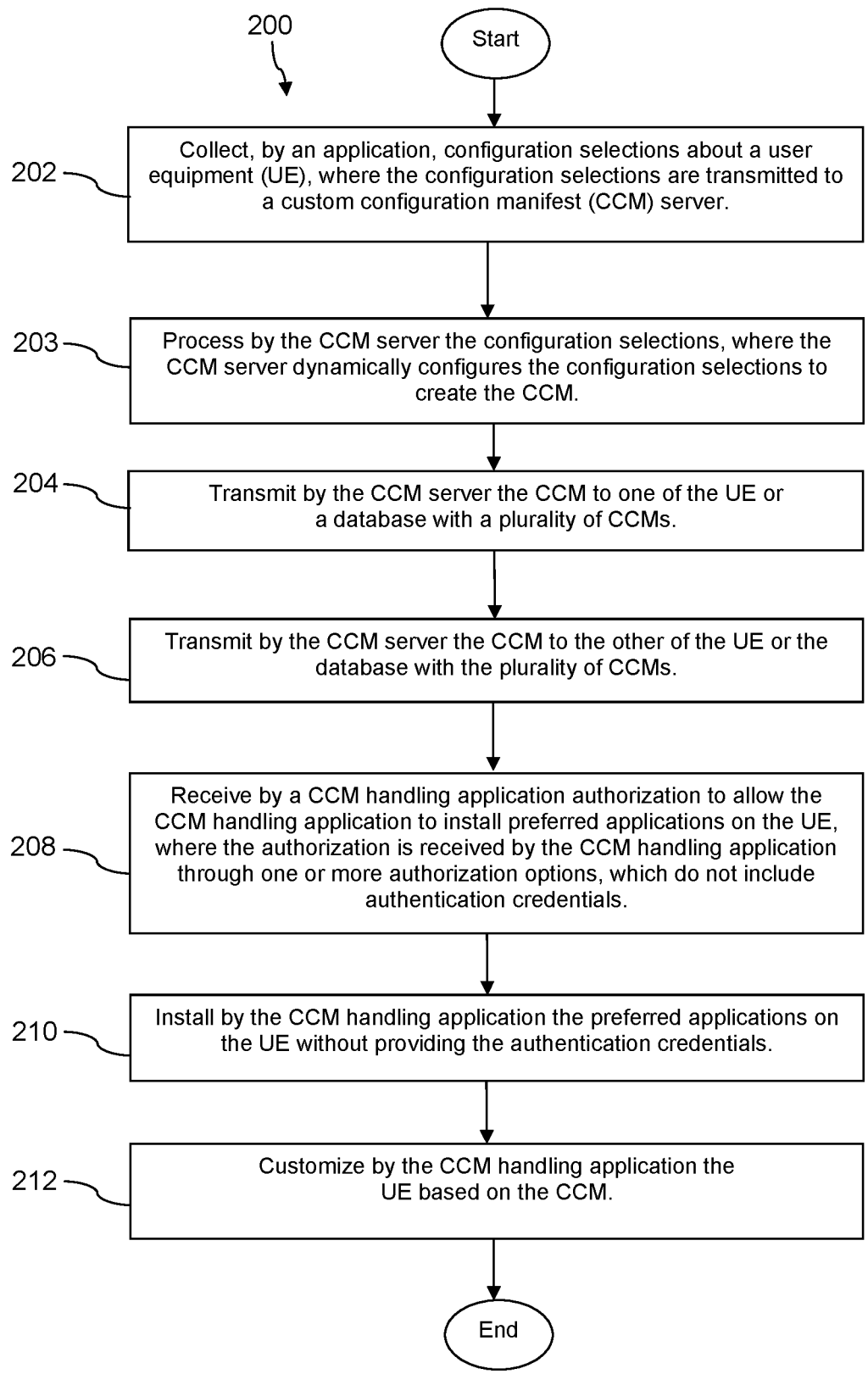
FIG. 2 is a flow chart of a method according to an embodiment of the disclosure.

Turning now to FIG. 2, a method 200 is described. At block 202, an application collects configuration selections about a user equipment (UE), where the configuration selections are transmitted to a custom configuration manifest server. For example, the MSA application 116 may transmit information regarding the configuration selections to the custom configuration manifest server 108. In an embodiment, a sales representative at a retail store helping a user, or a customer, may record the configuration selections by entering the configuration selections into a notebook or a workstation that contains the MSA application 116, writing down the configuration selections, or recording the configuration selections in any other way in accordance with the disclosure. In another embodiment, the sales representative or the customer may enter the configuration selections into an electronic device with an automated system and/or the MSA application 116 that records the configuration selections.

In an embodiment, the configuration selections may include any applications that the customer wants installed on the UE 102. These applications may include an electronic mail application, a messaging application, a social media application, and any other application in accordance with the disclosure. The configuration selections may also include any aesthetic features associated with the UE 102. These aesthetic features may include a home screen background, a screen saver, a lock screen background, an arrangement of applications on a screen of the UE 102, and any other aesthetic feature in accordance with the disclosure.

The MSA application 116 may connect with the UE 102 through the network 104 between a device containing the MSA application 116 and the UE 102, through the network 104 between the device containing the MSA application 116 and the eNB 106, a wired connection between the device containing the MSA application 116 and the UE 102, a Wi-Fi connection between the device containing the MSA application 116 and the UE 102, a Bluetooth® connection between the device containing the MSA application 116 and the UE 102, any combination thereof, and/or any other means of connection in accordance with the disclosure.

At block 203, the custom configuration manifest server processes the configuration selections, where the custom configuration manifest server dynamically configures the configuration selections to create the custom configuration manifest. For example, the custom configuration manifest server 108 may dynamically process the configuration selections and configure a custom configuration manifest as the custom configuration manifest server 108 receives the configuration selections. Alternatively, the custom configuration manifest server 108 may begin to process the configuration selections and configure the custom configuration manifest after the custom configuration manifest server 108 has received all of the configuration selections.

At block 204, the custom configuration manifest server transmits the custom configuration manifest to one of the UE or a database with a plurality of custom configuration manifests.

At block 206, the custom configuration manifest server transmits the custom configuration manifest to the other of the UE or the database with the plurality of custom configuration manifests. For example, the custom configuration manifest server 108 may first transmit the custom configuration manifest to the UE 102 and then transmit the custom configuration manifest to the custom configuration manifest database 110. Alternatively, the custom configuration manifest server 108 may first transmit the custom configuration manifest to the custom configuration manifest database 110 and then transmit the custom configuration manifest to the UE 102. The custom configuration manifest server 108 may also transmit the custom configuration manifest to both the custom configuration manifest database 110 and the UE 102 simultaneously. In an embodiment, the custom configuration manifest server 108 may transmit the custom configuration manifest through the network 104 to the UE 102 and the custom configuration manifest database 110. In another embodiment, the custom configuration manifest server 108 may transmit the custom configuration manifest to the custom configuration manifest database 110, and then the custom configuration manifest database 110 may transmit the custom configuration manifest through the network 104 to the UE 102. In another embodiment, the custom configuration manifest server 108 may transmit the custom configuration manifest to the eNB 106, and then the eNB 106 may transmit the custom configuration manifest to the UE 102. In a further embodiment, the custom configuration manifest server 108 may send a SMS to the UE 102 that may prompt the UE 102 to retrieve the custom configuration manifest from the custom configuration manifest server 108. Any other means of transmission in accordance with the disclosure may also occur.

At block 208, a custom configuration manifest handling application receives authorization to allow the custom configuration manifest handling application to install preferred applications on the UE, where the authorization was received by the custom configuration manifest handling application through one or more authorization options, which do not include authentication credentials. For example, the authorization options may include, in combination or alone, a request to electronically sign a notice authorizing the custom configuration manifest handling application 118 to install the preferred applications (the notice may be on a sales representative's notebook, workstation, or any other item in accordance with the disclosure), an audio recording authorizing the custom configuration manifest handling application 118 to install the preferred applications, a user interface on the UE 102 that prompts "yes" or "no" when asked if the custom configuration manifest handling application 118 is authorized to install the preferred applications, and/or any other option in accordance with the disclosure.

In an embodiment, the custom configuration manifest server 108 may push notifications to the custom configuration manifest handling application 118 once the custom configuration manifest is installed on the UE 102. The pushed notifications may notify or instruct the custom configuration manifest handling application 118 to check the custom configuration manifest server 108 for any applications, updates, or anything else that may need to be installed or be desired to be installed on the UE 102 during the activation process. The custom configuration manifest handling application 118 may then pull the applications, updates, or other items from the custom configuration manifest server 108 and install them on the UE 102. In a preferred embodiment, the custom configuration manifest server 108 may push a notification to the custom configuration manifest handling application 118 to pull down from the custom configuration manifest server 108 and install on the UE 102 the preferred applications.

In an embodiment, the preferred applications may comprise any application that the communication service provider desires to be installed on the UE 102. In a preferred embodiment, one of the preferred applications may be a communication service provider custom outreach and concierge function application. The communication service provider custom outreach and concierge function application may include a plurality of applications, or the communication service provider custom outreach and concierge function application may include one application. Some of the applications that may be included in the communication service provider custom outreach and concierge function application may allow a customer to manage his or her account, view and pay bills, check upgrade eligibility, view and report network performance, conveniently call customer service, shop an application store supported by the communication service provider, get device tips and support, find a store and schedule a visit, set account limits and permissions, get the latest news and product or service offers, and any other ability in accordance with the disclosure.

At block 210, the custom configuration manifest handling application installs the preferred applications on the UE without providing the authentication credentials. For example, the authentication credentials may include a password to unlock the UE 102, a PIN to unlock the UE 102, a pattern to unlock the UE 102, or any other information in accordance with the disclosure that may grant access to the UE 102 that is generally kept private. In an embodiment, the PIN or other authentication credentials may be maintained by the communication service provider.

At block 212, the custom configuration manifest handling application customizes the UE based on the custom configuration manifest. In an embodiment, the custom configuration manifest handling application customizes the UE based further on a subscription plan and the configuration selections. For example, the custom configuration manifest handling application 118 may take into account a subscription plan and the configuration selections to determine preferred applications that should be installed on the UE 102 to maximize the performance of the UE 102 and to fulfill any details or options included in the subscription plan and the configuration selections. In an embodiment, the custom configuration manifest handling application 118 may have a feature that causes the custom configuration manifest handling application 118 to remove itself and/or the custom configuration manifest from the UE 102 after the UE has been customized. Alternatively, that feature may be included in the custom configuration manifest. This may result in the UE 102 no longer having a custom configuration manifest handling application 118 and/or a custom configuration manifest after the initial set up and activation of the UE 102 and resulting installation of any preferred applications that the custom configuration manifest handling application 118 may have installed on the UE 102.

In an embodiment, the custom configuration manifest handling application 118 may be transmitted to a UE 102 that may be leased from the communication service provider. When a UE 102 is leased, a fee to the communication service provider may be paid every month, every other month, every three months, or at any other set time period in accordance with the disclosure. The fee may allow the UE 102 to access a network 104 provided by the communication service provider. When a UE 102 is leased, the custom configuration manifest handling application 118 and/or the custom configuration manifest may remain on the UE 102 after the UE 102 is activated (i.e., the custom configuration manifest handling application 118 and/or the custom configuration manifest may not have a feature that causes the custom configuration manifest handling application 118 and/or the custom configuration manifest to remove itself from the UE 102 after the UE has been customized). The custom configuration manifest may be managed on the UE 102 by a lease enforcement application 120. In an embodiment, the lease enforcement application 120 may not be able to be deleted, removed, blocked, or hindered in any other way in accordance with the disclosure.

The lease enforcement application 120 may be controlled by the communication service provider. The lease enforcement application 120 may monitor a condition of a lease. The lease enforcement application 120 may periodically or continuously communicate back to the communication service provider to check on a status of the lease and/or a status of a bill. In an embodiment, the lease enforcement application 120 may communicate back to the communication service provider weekly, monthly, the day before each billing cycle ends, the day after each billing cycle ends, or at any other time period in accordance with the disclosure. In an embodiment, the lease enforcement application 120 may monitor whether the communication service provider has been paid according to a chosen payment schedule as dictated by terms of the lease, whether an amount of data has been used that may be limited by the terms of the lease, whether an amount of text messages has been sent or received that may be limited by the terms of the lease, whether phone calls have been made for an amount of minutes that may be limited by the terms of the lease, or whether any other terms of the lease in accordance with the disclosure have been satisfied.

If the lease enforcement application 120 determines that the terms of the lease have not been satisfied, then the lease enforcement application 120 may take action to create a notification indicating non-compliance with the lease. In an embodiment, the lease enforcement application 120 may lock the screen of the UE 102, change the password of the UE 102, disable calling, texting, and/or data service of the UE 102, send a message through a user interface to the UE 102 stating that the lease has not been satisfied and requiring the terms of the lease to be satisfied (e.g., make a payment that may be overdue), send a user interface to the UE 102 that may allow financial information to be entered and any overdue payments to be paid, or any other action in accordance with the disclosure.

In an embodiment, the custom configuration manifest may be used to implement parental controls on the UE 102. The parental controls may include restricting text messaging access during certain periods of the day (e.g., when a child is at school), restricting access to applications that may have an undesired rating (e.g., as non-limiting examples, 9+, 12+, and 17+), restricting phone numbers that may be called, and any other restriction in accordance with the disclosure. When a UE 102 is leased, the custom configuration manifest may still be installed on the UE 102 after device activation has been completed, and this may give parents more ability to enforce parental controls and more options for parental controls. The communication service provider may allow parents to have access to remote management controls, which may be controlled by the custom configuration manifest. If the custom configuration manifest is not on the UE 102, there may not be any ability to use the remote management controls. Without the remote management controls kids may be able to change passwords or other security features on the UE 102 and disable any parental controls that may be present on the UE 102. However, if the remote management controls are available, the communication service provider or parents may be able to have more control of the UE 102 and implement any desired restrictions without the kids being able to disable the restrictions because the kids may not be able to change any security features without having access to the remote management controls.

In an embodiment, a UE 102 may no longer be provisioned to receive wireless communication service from the network 104. This type of UE 102 may be described as an unconnected UE. The unconnected UE may no longer be provisioned to receive wireless communication service from the network 104 because a contract or lease expired, a data plan expired, lease payments stopped being paid, or for any other reason in accordance with the disclosure. The unconnected UE may still be able to function with a Wi-Fi connection or for functions that may not need wireless communication service from the network 104. A problem with an unconnected UE, though, is that the unconnected UE may still attempt to gain access to the network 104 by sending requests to a first access point name server 112 or attempting to connect to the network 104 in any other manner in accordance with the disclosure. There may be hundreds, thousands, millions, or any other amount of unconnected UEs in accordance with the disclosure. In an embodiment, the unconnected UEs may attempt to connect to the network 104 through the first access point name server 112 thousands of times every second. However, the frequency with which the unconnected UEs attempt to connect to the network 104 may vary by any amount in accordance with the disclosure.

The connection attempts by the unconnected UEs may cause the network 104 and/or the first access point name server 112 to have a larger than usual amount of traffic, which may cause the network 104 and/or the first access point name server 112 to slow down, process connection attempts for connected UEs in an untimely manner, lose connection for some UEs, drop calls, or have any other reaction to the increased number of connection attempts in accordance with the disclosure. In an embodiment, a second access point name server 114 may be used to decrease the traffic on the first access point name server 112.

In an embodiment, the custom configuration manifest handling application 118 may still be installed on the UE 102 even when the UE 102 is no longer provisioned to receive wireless communication service from the network 104. The custom configuration manifest handling application 118 may still communicate with and/or handle a first custom configuration manifest (i.e., the custom configuration manifest that may have been installed on the UE 102 during activation of the UE 102). When the UE 102 is no longer provisioned to receive wireless communication service from the network 104, which may occur for any of the reasons discussed above, the custom configuration manifest server 108 may transmit a signal to the custom configuration manifest handling application 118. This signal may instruct the custom configuration manifest handling application 118 to pull down a second custom configuration manifest from the custom configuration manifest server 108. This second custom configuration manifest may identify the second access point name server 114. This may be done through a user interface on the unconnected UE that provides a link to a website where a configuration manifest (e.g., the second custom configuration manifest) may be installed that may cause the unconnected UE to send its connection attempts to the second access point name server 114. However, the second custom configuration manifest may identify the second access point name server 114 in any other manner in accordance with the disclosure. In an embodiment, the second access point name server 114 may be different than the first access point name server 112.

In an embodiment, once the unconnected UE sends a connection attempt to the second access point name server 114, the second access point name server 114 may cause the unconnected UE to think that the unconnected UE is provisioned to receive wireless communication service from the network 104. By tricking the unconnected UE into thinking it is provisioned to receive wireless communication service from the network 104, the second access point name server 114 may cause the unconnected UE to stop sending connection attempts to the first access point name server 112 and/or the second access point name server 114. In a preferred embodiment, the second access point name server 114 may reduce traffic on the network 104 and/or the first access point name server 112 by causing connection attempts by unconnected UEs to not occur on the first access point name server 112.

Figure 3:
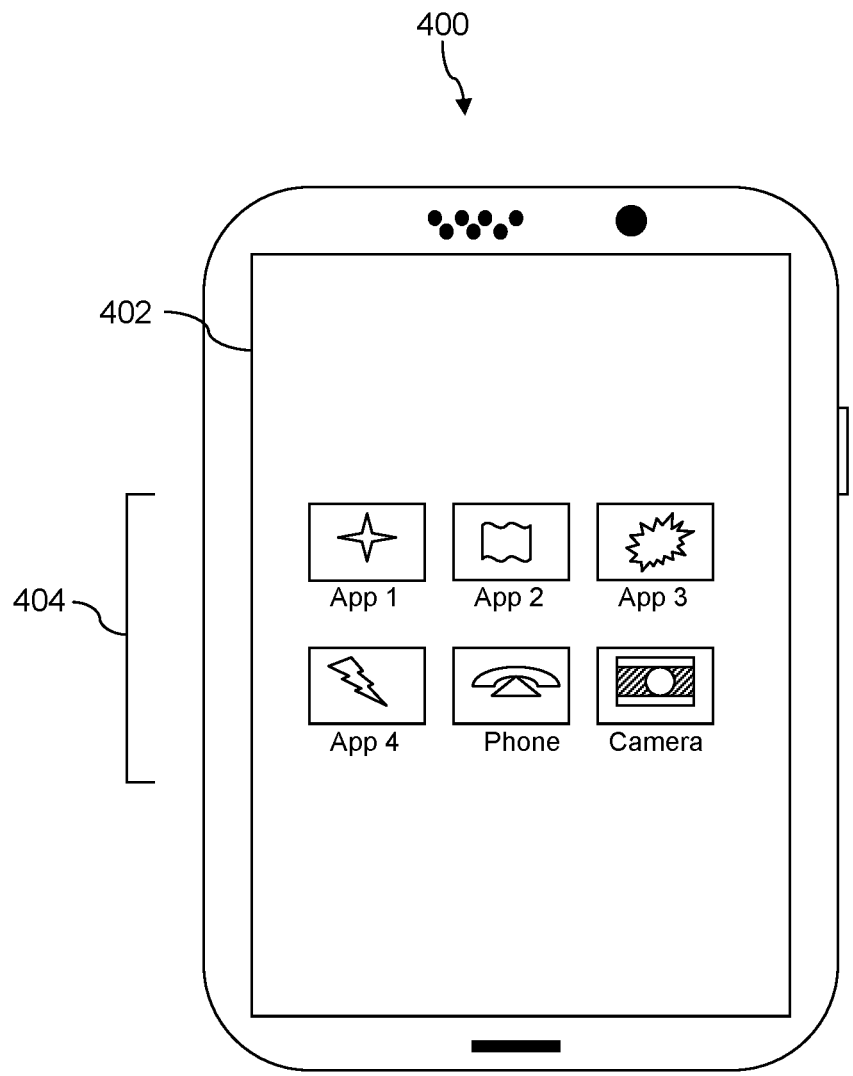
FIG. 3 is an illustration of a user equipment (UE) according to an embodiment of the disclosure.

FIG. 3 depicts the UE 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400, or any other wireless communication network or system.

Figure 4:
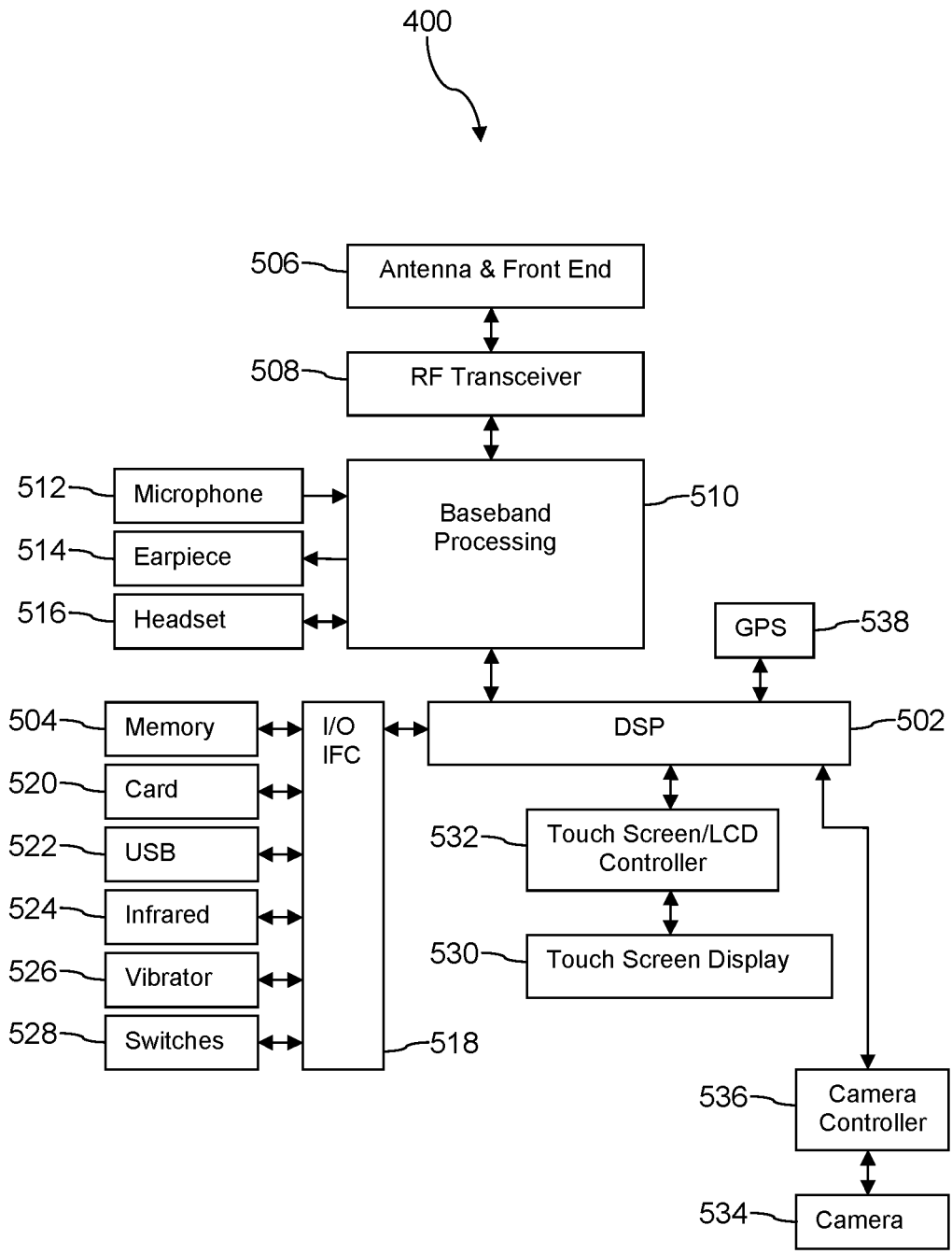
FIG. 4 is a block diagram of a UE according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
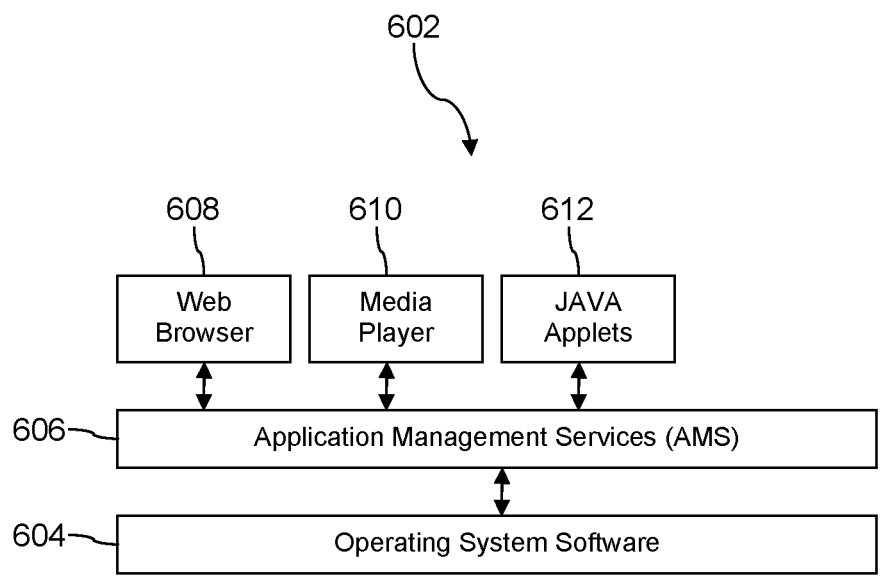
FIG. 5A is a block diagram of a software architecture for a UE according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
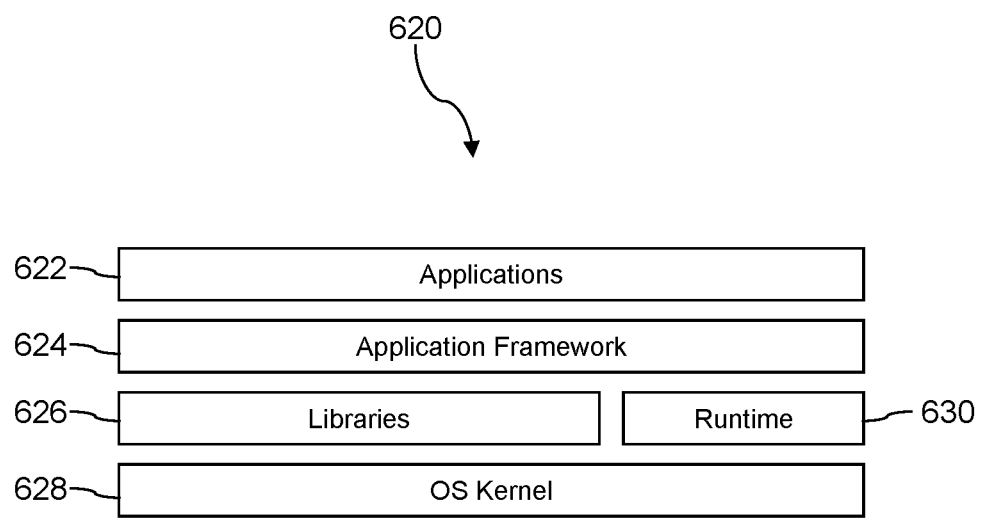
FIG. 5B is a block diagram of a software architecture for a UE according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
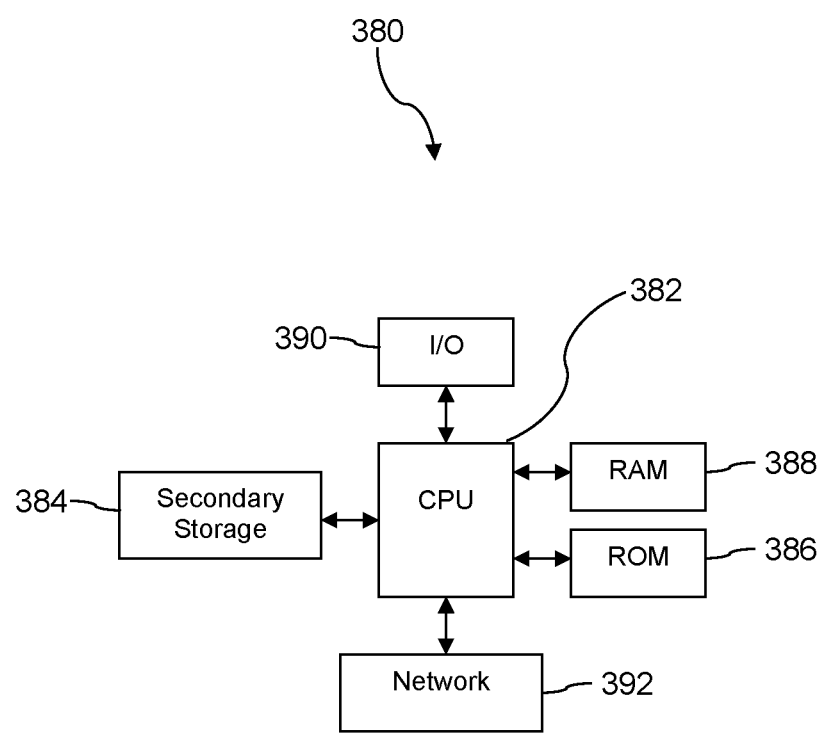
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing a custom configuration manifest, comprising:
    collecting, by an application stored on a device associated with a sales representative at a retail store, configuration selections about a user equipment (UE), where the configuration selections are transmitted to a custom configuration manifest server;
    processing, by the custom configuration manifest server, the configuration selections, where the custom configuration manifest server dynamically configures the configuration selections to create the custom configuration manifest;
    transmitting, by the custom configuration manifest server, the custom configuration manifest to one of the UE or a database with a plurality of custom configuration manifests;
    transmitting, by the custom configuration manifest server, the custom configuration manifest to the other of the UE or the database with the plurality of custom configuration manifests;
    receiving, by a custom configuration manifest handling application stored on the UE, authorization to allow the custom configuration manifest handling application to install preferred applications on the UE, where the authorization is received by the custom configuration manifest handling application through one or more authorization options, which do not include authentication credentials;
    installing, by the custom configuration manifest handling application, the preferred applications on the UE without providing the authentication credentials; and
    customizing, by the custom configuration manifest handling application, the UE based on the custom configuration manifest.

2. The method of claim 1, wherein customizing the UE by the custom configuration manifest handling application is further based on a subscription plan and the configuration selections.

3. The method of claim 1, wherein the configuration selections comprise an electronic mail application, a messaging application, a social media application, a home screen background, a screen saver, a lock screen background, and an arrangement of applications on the UE.

4. The method of claim 1, wherein the custom configuration manifest server contains a plurality of configuration selections.

5. The method of claim 1, wherein providing the authorization comprises a request to electronically sign a notice authorizing the custom configuration manifest handling application to install the preferred applications.

6. The method of claim 5, wherein the notice is on a sales representative's notebook or workstation.

7. The method of claim 5, wherein the preferred applications comprise a communication service provider customer outreach and concierge function application.

8. The method of claim 1, wherein the authorization comprises an audio recording authorizing the custom configuration manifest handling application to install the preferred applications.

9. The method of claim 1, wherein the authorization comprises a user interface on the UE that prompts "yes" or "no" when asked if the custom configuration manifest handling application is authorized to install the preferred applications.

10. The method of claim 1, wherein the authentication credentials comprises at least one of a password, a PIN, and a pattern to unlock the UE.

11. A user equipment (UE), comprising:
at least one processor;
a non-transitory memory;
a custom configuration manifest handling application stored in the non-transitory memory that, when executed by the processor:
pulls down a custom configuration manifest during device activation, where the custom configuration manifest is pulled down from a custom configuration manifest server, and
configures the UE based on the custom configuration manifest; and
a lease enforcement application stored in the non-transitory memory that, when executed by the processor:
monitors a lease satisfaction status by checking the custom configuration manifest server,
determines a lease non-compliance based on monitoring the lease satisfaction status by checking the custom configuration manifest server, and
restricts functionality of the UE in response to the determination of lease non-compliance.

12. The UE of claim 11, wherein the custom configuration manifest remains installed on the UE after the UE is activated.

13. The UE of claim 12, wherein the custom configuration manifest cannot be removed or deleted from the UE.

14. The UE of claim 11, wherein the lease enforcement application remains installed on the UE after the UE is activated.

15. The UE of claim 11, wherein the lease satisfaction status is determined by monitoring whether a communication service provider has been paid according to a chosen payment schedule as dictated by terms of a lease, whether an amount of data has been used that may be limited by the terms of the lease, whether an amount of text messages has been sent or received that may be limited by the terms of the lease, and whether phone calls have been made or received for an amount of minutes that may be limited by the terms of the lease.

16. The UE of claim 11, wherein restricting functionality of the UE comprises at least one of locking a screen of the UE, sending a message indicating that a lease has not been complied with, sending a user interface to the UE that allows for an overdue payment to be paid and the lease to be continued, and changing a password to deny access to the UE.

17. The UE of claim 11, wherein the lease enforcement application restricts functionality of the UE by sending a user interface to the UE, and wherein the user interface comprises a screen that restricts access to some functions of the UE.

18. The UE of claim 17, wherein access to general voice call service, access to email service, access to a contacts list, access to a browser application, access to a communication application, access to a media player application, and access to a camera application are blocked by the user interface.

19. The UE of claim 18, wherein the user interface allows for an overdue payment to be paid and the lease to be continued.

20. The UE of claim 19, wherein the user interface allows a call to be placed to a wireless communication service provider to pay the overdue payment.

* * * * *